United States Patent [19]

Dasgupta

[11] Patent Number: 5,338,407
[45] Date of Patent: Aug. 16, 1994

[54] ENHANCEMENT OF PAPER DRY STRENGTH BY ANIONIC AND CATIONIC GUAR COMBINATION

[75] Inventor: Sunil P. Dasgupta, Wilmington, Del.

[73] Assignee: Hercules Incorporated, Wilmington, Del.

[21] Appl. No.: 812,534

[22] Filed: Dec. 23, 1991

[51] Int. Cl.$^5$ .............................................. D21H 17/32
[52] U.S. Cl. ................... 162/168.3; 162/111; 162/178; 162/183
[58] Field of Search ............ 162/175, 178, 183, 168.3, 162/111, 112

[56] References Cited

U.S. PATENT DOCUMENTS

| | | | |
|---|---|---|---|
| 3,049,469 | 8/1962 | Davison | 162/164 |
| 3,332,834 | 7/1967 | Reynolds, Jr. | 162/164 |
| 3,819,555 | 6/1974 | Kaufman | 260/29.4 UA |
| 4,002,588 | 1/1977 | Strazdins | 260/29.6 NR |
| 4,925,530 | 5/1990 | Sinclair et al. | 162/168.3 |

FOREIGN PATENT DOCUMENTS

| | | |
|---|---|---|
| 0362770 | 4/1990 | European Pat. Off. |
| 782037 | 4/1978 | South Africa |

OTHER PUBLICATIONS

Casey, *Pulp and Paper*, 3rd ed. (1981) vol. III pp. 1501–1506.

*Primary Examiner*—Peter Chin
*Attorney, Agent, or Firm*—Roy V. Jackson

[57] ABSTRACT

A process for making paper to enhance the dry strength of the paper produced without reducing its softness, that comprises adding to a bleached pulp furnish a mixture of an anionic carboxymethyl guar or a carboxymethyl hydroxyethyl guar with a cationic guar that may be prepared by reacting a natural guar with caustic and subsequently with quaternary ammonium chloride.

7 Claims, No Drawings

ENHANCEMENT OF PAPER DRY STRENGTH BY ANIONIC AND CATIONIC GUAR COMBINATION

This invention relates to a process for making paper to enhance the dry strength of the paper produced without reducing its softness, that comprises adding to a pulp furnish a combination of cationic and anionic polymers.

BACKGROUND OF THE INVENTION

One of the major problems that tissue and towel manufacturers face is the unacceptable reduction of dry strength in their products resulting from the use of an increasing percentage of recycled or secondary pulp, chemithermomechanical pulp (CTMP) and groundwood, and consequent reduction in average fiber length in paper products such as tissue and toweling in which a high degree of softness as well as dry strength is essential. Softness is a very important property in paper used for making high quality tissues and toweling, and procedure modifications or additives that achieve an increase in paper strength normally causes a decrease in paper softness or an increase in stiffness. There is therefore a need for an effective additive that will enhance paper strength without adversely affecting the softness of the paper.

European published Patent No. 0362 770A2 (Application No. 89118245.3) discloses a mixture of cationic and anionic polymers as a strengthening additive for papermaking processes, essentially for unbleached pulps containing black liquor. The mixture comprises a water-soluble, linear, cationic polymer having a reduced specific viscosity greater than 2dl/g and a charge density of 0.2 to 4 meq/g, and a water-soluble, anionic polymer having a charge density of less than 5 meq/g that is reactable in the presence of water with cationic polymer to form a polyelectrolyte complex. Combinations of cationic guar (for example, guar "derivatized" with glycidyltrimethylammonium chloride) and cationic acrylamide copolymers, with anionic polymers in addition to those already contained in the black liquor (including sodium carboxymethyl guar) are disclosed. The preferred anionic polymer content is constituted by those polymers naturally present in unbleached pulps made by either chemical or mechanical pulping.

It would be desirable to provide a a process for making paper from a bleached pulp furnish that uses a combination of cationic and anionic polymers to enhance the dry strength of the paper more efficiently than the known processes.

SUMMARY OF THE INVENTION

According to the invention, a process for making paper to enhance the dry strength of the paper produced without reducing its softness comprises adding to a bleached pulp furnish a mixture of an anionic carboxymethyl guar or a carboxymethyl hydroxyethyl guar, such as the carboxymethyl guar available under the name Galaxy 707D from Aqualon and the names Jaquar 8600 or Jaquar 8707 from Hi-Tek, or a carboxymethyl hydroxyethyl guar, with a cationic polymer selected from the group consisting of a cationic acrylamide copolymer and a cationic guar that may be prepared by reacting a natural guar with caustic and subsequently with quaternary ammonium chloride such as that available from Dow as Dow Quart 188; such a cationic guar is available under the name Gendrive 162.

In a bleached pulp furnish, the combination of additives according to the invention is significantly more effective as a dry-strength additive than the same amounts of each of the cationic guar or the anionic guar with a retention aid, while maintaining substantially the same degree of softness, as measured by bending stiffness, as found in paper lacking a conventional dry-strength additive. These advantages are only found if bleached pulp is used in the process according to the invention. A combination of an anionic guar and a cationic acrylamide copolymer is similarly more effective than the acrylamide copolymer alone as a dry strength additive at the same level of addition.

The effectiveness of the anionic/cationic guar combination according to the invention is maintained when a wet strength resin such as Kymene ® 557H is added to the guars; a combination of an anionic guar, cationic guar (or acrylamide copolymer) and the wet strength resin is more effective than either a combination of a cationic guar (or acrylamide copolymer) and the wet strength resin or a combination of an anionic guar and the wet strength resin, all the other conditions being the same.

When clear solutions of the individual components of the mixtures according to the invention are added together, aggregates of fine colloidal particles, apparently bound together by some physical or chemical force, are formed. This combination provides dry strength enhancement for paper containing chemithermomechanical pulp, which is unexpectedly higher than the strength enhancement provided by the same amount of either the cationic guar or the anionic guar with a retention aid, demonstrating the synergistic effect.

Under the normal wet end conditions of papermaking, these guar additives enhance paper strength through ionic bonds. A cationic guar molecule with no anionic guar will have all its ionic groups available to bond with the cellulose-fiber ionic groups of opposite charge. Thus, a cationic guar by itself is expected to offer a higher number of ionic bonds. When an anionic and a cationic guar are mixed together either in the presence of pulp or by themselves, the inter-action that takes place between them results in a lower number of ionic sites in the combination to bond with cellulose fibers. Hence, the synergistic effect of the combination as a dry strength additive according to-the invention is unexpected, particularly since it is not present if used with unbleached pulp containing black liquor.

The method according to the invention is useful in the manufacture of tissue, towel, sanitary paper, and any other paper product for which softness is an important feature and dry strength or a combination of dry and wet strength must be achieved without compromising softness.

DETAILED DESCRIPTION OF THE INVENTION

Guar is a natural copolymer consisting of galactose and mannose, usually in the ratio of 1 to 2, in a linear chain of $\beta$-d-mamopyransyl with $\lambda$-D-galactopyranosyl units as side branches. The structure of natural guar gum is as follows:

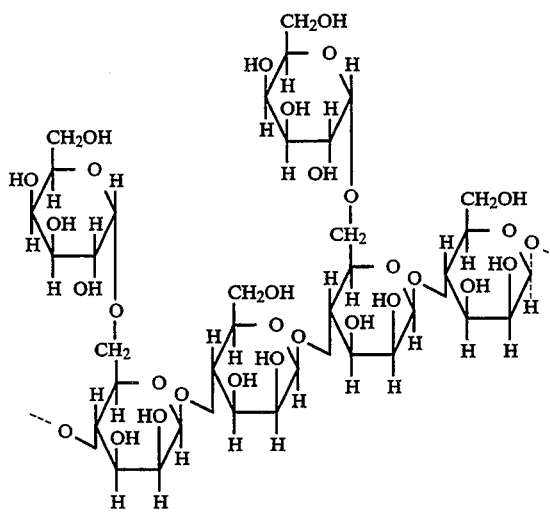

An anionic guar is obtained by reacting a natural guar with caustic and subsequently with monochloroacetate. The resultant product is a carboxymethyl guar. Examples of the carboxymethyl guars (anionic) are available under the names Galaxy 707D from Aqualon and Jaquar 8600 or Jaquar 8707 from Hi-Tek. Carboxymethyl hydroxyethyl guars are other examples of anionic guar additives.

A cationic guar is prepared by reacting natural guar with caustic and subsequently with quaternary ammonium chloride, such as Dow Quart 188. Examples of cationic gusts are available under the names Gandrive 162 or Galactose 813 from Aqualon and Jaguar CR-13 or Jaguar 8917 from Hi-Tek.

The specific amount and the type of the combination of additives will depend on, among other things, the type of pulp characteristics. In general, the ratios of the anionic and the cationic additives may range from 1/20 to 10/1, preferably from 2/1 to ½, and most preferably about 1/1. The combination according to the invention is effective when added to the pulp stock in the amount of 0.05 to 5 percent, depending on the type of pulp the preferable level of addition is 0.1 to 2% based on the dry weight of pulp. The additives, either individually or blended together, are mixed into the wet end of the paper machine, preferably under shear.

The tissue and towel manufacturers get the softness of their products evaluated by the perception of a human panel. Because it is a very subjective test, correlation of any single laboratory test evaluation with the perception test results may be unreliable. However, measurements of the combined effect of sheet stiffness, surface friction, and thickness in a bending stiffness test by itself or in combination with tensile stiffness data, are known to reasonably correlate with human perception evaluation. Such measurements of bending stiffness of a papersheet can be made by a "Handle O'Meter" (Thwing-Albert Instrument Co., Philadelphia, Pa.).

The following examples further illustrate the invention. The pulp was refined in a Valley beater to 500±5cc Canadian Standard Freehess. The 2.50% consistency pulp slurry was diluted to 0.266% solids with normal tap water in a proportioner where the strength additives were added to the pulp while stirring. An aliquot of this pulp slurry was further diluted to about 0.023% consistency in a Deckle box for molding handsheets. Both refining and papermaking were made at pH 7.5 to 8.0, and drying was to a moisture content of 3 to 6 percent).

The anionic component was added to the pulp first, followed by the cationic component; and Kymene in the case of wet strength system. Tensile strength, modulus, and elongation were measured in an Inetton, according to the standard procedure of Tappi 494 (Holger Hollmark, TAPPI Journal, p 97, Feb. 1983; Handbook of Physical and Mechanical Testing of Paper and Paperboard, Ed. Richard E. Mark, Ch. 11, p 511, 1983). By the same testing procedure, the tensile energy per unit volume that the fibers have assimilated up to the point of rupture was also determined. This is referred to as tensile energy absorption (TEA).

EXAMPLE 1

Laboratory evaluation of strength properties and bending stiffness on handsheets prepared with 70/30 Northern Softwood/CTMP furnish. The results are shown in Table 1. The anionic additive was first added to the pulp followed by the cationic additive. The control used in this case is a handsheet prepared with the same pulp with no additive. Galaxy 707D is a carboxymethyl guar (DS 0.08), and Gendrive 162 is a quaternary ammonium chloride treated guar (DS 0.075). Reten® 200 is a polyamide-epichlorohydrin polymeric material used as a retention aid.

TABLE 1

| Anionic Additive | % | Cationic Additive | % | Tensile Strength % of Control | Bending Stiffness % of Control |
|---|---|---|---|---|---|
| None | — | Gendrive 162 | 1.0 | 106.5 | — |
| Galaxy 707D | 0.5 | Reten ® 200 | 0.4 | 108.3 | — |
| Galaxy 707D | 0.5 | Gendrive 162 | 0.5 | 133.9 | 94 |

EXAMPLE 2

Results on laboratory evaluation of strength properties, tensile stiffness and bending stiffness on handsheets prepared are presented in Table 2. Pulp system employed in set No. 1 is 50/50 recycled/northern softwood bleached kraft pulp. In set No. 2, the pulp is 100 percent bleached kraft. The process to prepare the guars is very similar to what has been explained in Example 1, except that the anionic guar was a carboxymethyl guar (available from Aqualon under the designation AQU-D3129) having a DS of 0.15 and the cationic guar (available from Aqualon under the designation 404-48-3) was a quaternary-modified guar having a DS of 0.10.

EXAMPLE 3

Laboratory evaluation results of strength properties and bending stiffness on handsheets prepared with a recycled pulp are shown in Table 3. The anionic additive is added to the pulp prior to adding the cationic additive. The guar additives Galaxy 707D and Gendrive 162 are the same as those used in Example 1. Kymene ® 557H is the reaction product of an alkylated polyamide and epichlorohydrin and conventionally used as a wet strength resin in paper.

TABLE 2

| None | Anionic Guar | % | Cationic Guar | % | Enhancement, % Control ||||
|---|---|---|---|---|---|---|---|---|---|
| | | | | | Tensile Strength | TEA | Elongation | Tensile Stiffness | Bending Stiffness |
| 1 | AQU-D3129 | 0.5 | 404-48-3 | 0.5 | 21.5 | 37. | 13.3 | 108 | 95 |
| 2 | AQU-D3129 | 0.5 | 404-48-3 | 0.5 | 15.2 | 31. | 16.1 | 99 | 99 |

TABLE 3

Strength Properties of Paper Furnish: Recycled Pulp

| Anionic Guar | % | Cationic Guar | % | Kymene 557H Percent | Enhancement, % Control |||||
|---|---|---|---|---|---|---|---|---|---|
| | | | | | Tensile | TEA | Elongation | Tensile Stiffness | Bending Stiffness |
| None | — | None | — | 1.00 | 11.9 | 20.6 | 22.2 | — | — |
| None | — | Gendrive 162 | 0.5 | 0.50 | 19.6 | 34.4 | 25.9 | — | — |
| Galaxy 707D | 0.25 | Gendrive 162 | 0.25 | 0.50 | 34.5 | 77.7 | 33.3 | 103 | 104 |

EXAMPLE 4

Results of evaluation of strength properties of handsheets prepared with recycled pulp are shown in Table 4. The anionic and the cationic guar additives are prepared in a similar process as described in Example 1. Guar AQU-3129 and High DS cationic guar (404-48-3) are products of Aqualon, while the Jaguar products are available from Hi-Tek Co.

TABLE 4

| Anionic Additive | Percent | Cationic Additive | Percent | Enhancement, % Control |||
|---|---|---|---|---|---|---|
| | | | | Tensile Strength | TEA | Elongation |
| None | — | 404-48-3 | 1.00 | 3.7 | 3.3 | 2.0 |
| AQU-D3129 | 0.50 | 404-48-3 | 0.50 | 14.3 | 29.3 | 14.4 |
| Jaguar 8707 | 0.50 | Jaguar CP-13 | 0.50 | 21.3 | 48.0 | 19.4 |

TABLE 4A

| Product | Charge Density (meq/g) | Viscosity (cp) 2% Solution |
|---|---|---|
| AQU-D3129 | −1.34 | 2,300 |
| 404-48-3 | 0.86 | 4,200 |
| Jaguar 8707 | −0.012 | 12,000 |
| Jaguar LP-13 | 0.23 | 23,000 |

EXAMPLE 5

Results of strength properties evaluation on handsheets prepared with unbleached kraft containing about 2 percent black liquor are shown in Table 5. The results show that a combination of an anionic and a cationic guar additive is not more effective than the cationic guar additive alone when added at the same total level. The guar additives, Galaxy 707D and Gendrive 162, are the same as used in Example 1.

EXAMPLE 6

Results of strength properties evaluation on handsheets prepared with partially unbleached kraft incorporated externally with 0.9% black liquor are presented in Table 6. The results show that a combination of an anionic and a cationic guar, when added to this unbleached kraft-black liquor system, is in fact less effective than the cationic guar alone at the same total addition level. The guar additives are the same as those used in Example 1.

TABLE 5

| Anionic Additive | Percent | Cationic Additive | Percent | Enhancement, % Control |||
|---|---|---|---|---|---|---|
| | | | | Tensile Strength | TEA | Elongation |
| Galaxy 707D | 0.50 | Gendrive 162 | 0.5 | 14.2 | 21.1 | 12.5 |
| None | — | Gendrive 162 | 1.0 | 16.9 | 25.3 | 12.5 |

TABLE 6

| Anionic Additive | Percent | Cationic Additive | Percent | Enhancement, % Control |||
|---|---|---|---|---|---|---|
| | | | | Tensile Strength (PSI) | TEA (ft.lb/ft$^2$) | Elongation (%) |
| Control | — | — | — | 5877 | 5.29 | 2.2 |
| Galaxy 707D | 0.5 | Gendrive 162 | 0.5 | 7644 | 7.58 | 2.6 |
| None | — | Gendrive 162 | 1.0 | 8684 | 10.62 | 3.0 |

EXAMPLE 7

Results of viscosity and relative specific viscosity (RSV) for 0.25% aqueous solutions of the guar additives are shown in Table 7. The results indicate the range of relative molecular weights of the additives employed in this work. Since these data do not lead to the absolute molecular weights of the additives, no comparison can be made with similar data for materials of different molecular shapes.

TABLE 7

| ADDITIVES | VISCOSITY (CP) | RSV (dl/g) |
| --- | --- | --- |
| Guar Gendive 162 | 31.1 | 121.5 |
| Guar Galaxy 707D | 9.0 | 32.4 |
| Guar Jaguar CP-13 | 66.5 | 223.8 |

I claim:

1. A process for making paper to enhance the dry strength of the paper produced without reducing its softness, that comprises adding to an aqueous bleached pulp furnish, together or separately, an anionic carboxymethyl guar or an anionic carboxymethyl hydroxyethyl guar and a cationic polymer selected from the group consisting of a cationic acrylamide copolymer and a cationic guar, the total amount of the anionic material and the cationic material being from 0.05 to 5% based on the dry weight of the pulp and the ratio of the anionic material to the cationic material being from 1/20 to 10/1, and forming paper from the aqueous furnish.

2. A process for making paper as claimed in claim 1, in which the cationic polymer is a cationic guar.

3. A process for making paper as claimed in claim 2, in which the anionic guar is obtained by reacting a natural guar with caustic and subsequently with monochloroacetate.

4. A process for making paper as claimed in claim 2, in which the cationic guar is obtained by reacting a natural guar with caustic and subsequently with quaternary ammonium chloride.

5. A process for making paper as claimed in claim 1, in which the anionic guar and the cationic guar are added in a total amount of 0.1 to 2%.

6. A process for making paper as claimed in claim 2, in which the ratio of the anionic guar to the cationic guar is from 2/1 to ½.

7. A process for making paper as claimed in claim 1, in which the ratio of the anionic guar to the cationic guar is about 1/1.

* * * * *